(12) United States Patent
Yamauchi

(10) Patent No.: US 6,328,787 B1
(45) Date of Patent: Dec. 11, 2001

(54) APPARATUS AND METHOD FOR TREATING GAS USING A HONEYCOMB ROTOR HAVING A PLURALITY OF DESORBING ZONES

(75) Inventor: Hisashi Yamauchi, Koga (JP)

(73) Assignee: Seibu Giken Co., Ltd., Fukuoka (JP)

( * ) Notice: Subject to any disclaimer, the term of this patent is extended or adjusted under 35 U.S.C. 154(b) by 0 days.

(21) Appl. No.: 09/468,640

(22) Filed: Dec. 22, 1999

(51) Int. Cl.[7] ................................................. B01D 53/06
(52) U.S. Cl. .................................................. 95/113; 96/125
(58) Field of Search ........................ 95/107, 113, 114; 96/125, 126, 127, 123, 150

(56) References Cited

U.S. PATENT DOCUMENTS

| | | | |
|---|---|---|---|
| 5,512,083 | * | 4/1996 | Dunne ..................................... 95/113 |
| 5,584,916 | * | 12/1996 | Yamashita et al. ..................... 96/125 |
| 5,667,560 | * | 9/1997 | Dunne ..................................... 95/113 |
| 5,695,546 | * | 12/1997 | Izumi et al. ............................. 95/113 |
| 5,701,762 | * | 12/1997 | Akamatsu et al. ...................... 96/125 |
| 5,702,505 | * | 12/1997 | Izumi et al. ............................. 95/113 |
| 6,080,227 | * | 6/2000 | Kurosawa et al. ...................... 96/125 |
| 6,165,254 | * | 12/2000 | Kawakami et al. .................... 96/125 |

FOREIGN PATENT DOCUMENTS

| | | | |
|---|---|---|---|
| 2-214517 | * | 8/1990 | (JP) ........................................ 96/125 |
| 5-115736 | * | 5/1993 | (JP) ........................................ 96/125 |
| 6-320 | * | 1/1994 | (JP) ........................................ 96/125 |
| 6-31132 | * | 2/1994 | (JP) ........................................ 96/125 |
| 6-63345 | * | 3/1994 | (JP) ........................................ 96/125 |
| 6-134242 | * | 5/1994 | (JP) ........................................ 96/125 |
| 6-226037 | | 8/1994 | (JP) ........................................ |
| WO 91/16971 | | 11/1991 | (WO) ...................................... |

OTHER PUBLICATIONS

*Seibu Giken Products*, "Puro–Save" VOC Concentrator, pp. 1–8 (1997).

\* cited by examiner

*Primary Examiner*—Duane S. Smith
(74) *Attorney, Agent, or Firm*—Staas & Halsey LLP

(57) ABSTRACT

An apparatus and method for treating gas, employ a honeycomb rotor carrying an adsorbent thereon. A casing having an adsorbing zone, a plurality of desorbing zones and a purge zone houses the honeycomb rotor. A drive device rotates the honeycomb rotor in the casing. A gas movement device moves gas through the casing and the honeycomb rotor. A heater heats gas moved through the purge zone. Gas from the purge zone is moved through the plurality of desorbing zones after being heated by the heater. Gas from one of the desorbing zones is discharged. Gas from a remainder of the desorbing zones is combined with gas containing contaminants to be removed, and then moved through the adsorbing zone and the purge zone.

16 Claims, 4 Drawing Sheets

APPARATUS AND METHOD FOR TREATING GAS USING A HONEYCOMB ROTOR HAVING A PLURALITY OF DESORBING ZONES

BACKGROUND OF THE INVENTION

1. Field of the Invention

The present invention relates to an apparatus for adsorbing and concentrating gases, such as volatile organic compounds (referred to hereinafter as "VOCs") and other gases, from air.

2. Description of the Related Art

Pressurized containers filled with adsorbents such as active carbon and zeolite have long been known in the art for the concentration and removal of VOCs and others gases contained in air. They function by passing air containing VOCs through the containers to adsorb the VOCs and other gases on the adsorbent. Next, the pressurized container is decompressed and the air containing the adsorbed VOC is discharged to concentrate the VOC. That is, adsorption and desorption are done through pressure changes. However, such devices are large and very expensive.

Therefore, an adsorption rotor was fabricated in a honeycomb shape from adsorbent carrying sheets. One example of adsorbent carrying sheets is described in International Patent Application No. WO91/16971. Air containing a VOC is passed through the adsorbing zone of a rotating adsorption rotor to adsorb the VOC. Next, a hot wind is sent through the desorbing zone, desorbing the VOC adsorbed on the rotor and concentrating the VOC.

This honeycomb-type concentrating and removing apparatus is smaller and less expensive than a pressure swing-type concentrating and removing apparatus. However, the concentration ratio of the honeycomb-type concentrating and removing apparatus is limited to about ten (10) times.

Recently, there is an increasing demand to remove VOCs from air containing low VOC concentrations. For example, liquid crystal display manufacturing plants produce gas having a low VOC concentration. The honeycomb-type concentrating and removing apparatus often fails at removing low VOC concentrations, however, discharging the air without treating the VOC. Nevertheless, even if the concentration of the VOC contained in the air is low, the need to recover the VOC is high.

Further, self combustion cannot be maintained if the air containing VOC has a low concentration. For example, VOC contained in the air at a concentration of about 50 ppm can be concentrated to about 500 ppm by using the honeycomb-type concentrating and removing apparatus. Unfortunately, self-combustion of the VOC contained in the air at 500 ppm concentration cannot be maintained. Therefore, methane or other gases are mixed with the VOC-containing air as back-up fuels to increase the concentration of the burnable gas.

In many cases, methane or other gases are mixed with the VOC containing air to get the burnable gas concentration to about 1000 ppm for treatment by a combusting device. In other words, the gas output from a concentrating device is mixed with methane (usually natural gas) to achieve a gas that can be burned.

When the concentration of gas increases, the quantity of the added methane gas is decreased, and when the concentration of the gas decreases, the quantity of the added methane gas is increased. And when the quantity of the added gas is increased, the emission of carbon dioxide from combusting device also increases.

SUMMARY OF THE INVENTION

Accordingly, it is an object of the present invention to provide a gas adsorbing and concentrating apparatus which has a high concentrating rate.

It is a further object of the present invention to provide a gas adsorbing and concentrating apparatus which has a high concentrating rate and is capable of treating air with low level VOCs or other gases.

It is a further object of the present invention to provide a gas adsorbing and concentrating apparatus which outputs a gas having a high concentration of VOCs or other gases, even if the concentration of VOCs or other gases in the air to be treated is low.

These and other objects are accomplished by providing an apparatus and method for treating gas with a honeycomb rotor carrying an adsorbent thereon. A casing having an adsorbing zone, a plurality of desorbing zones and a purge zone houses the honeycomb rotor. A drive device rotates the honeycomb rotor in the casing. A gas movement device moves gas through the casing and the honeycomb rotor. A heater heats gas moved through the purge zone. Gas from the purge zone is moved through the plurality of desorbing zones after being heated by the heater. Gas from one of the desorbing zones is discharged. Gas from a remainder of the desorbing zones is combined with gas containing contaminants to be removed, and then moved through the adsorbing zone and the purge zone.

BRIEF DESCRIPTION OF THE DRAWINGS

The invention will be readily understood by reference to the following description of specific embodiments described by way of example only, with reference to the accompanying drawings in which like reference characters represent like elements, wherein.

DETAILED DESCRIPTION OF THE PREFERRED EMBODIMENTS

Figure 1:
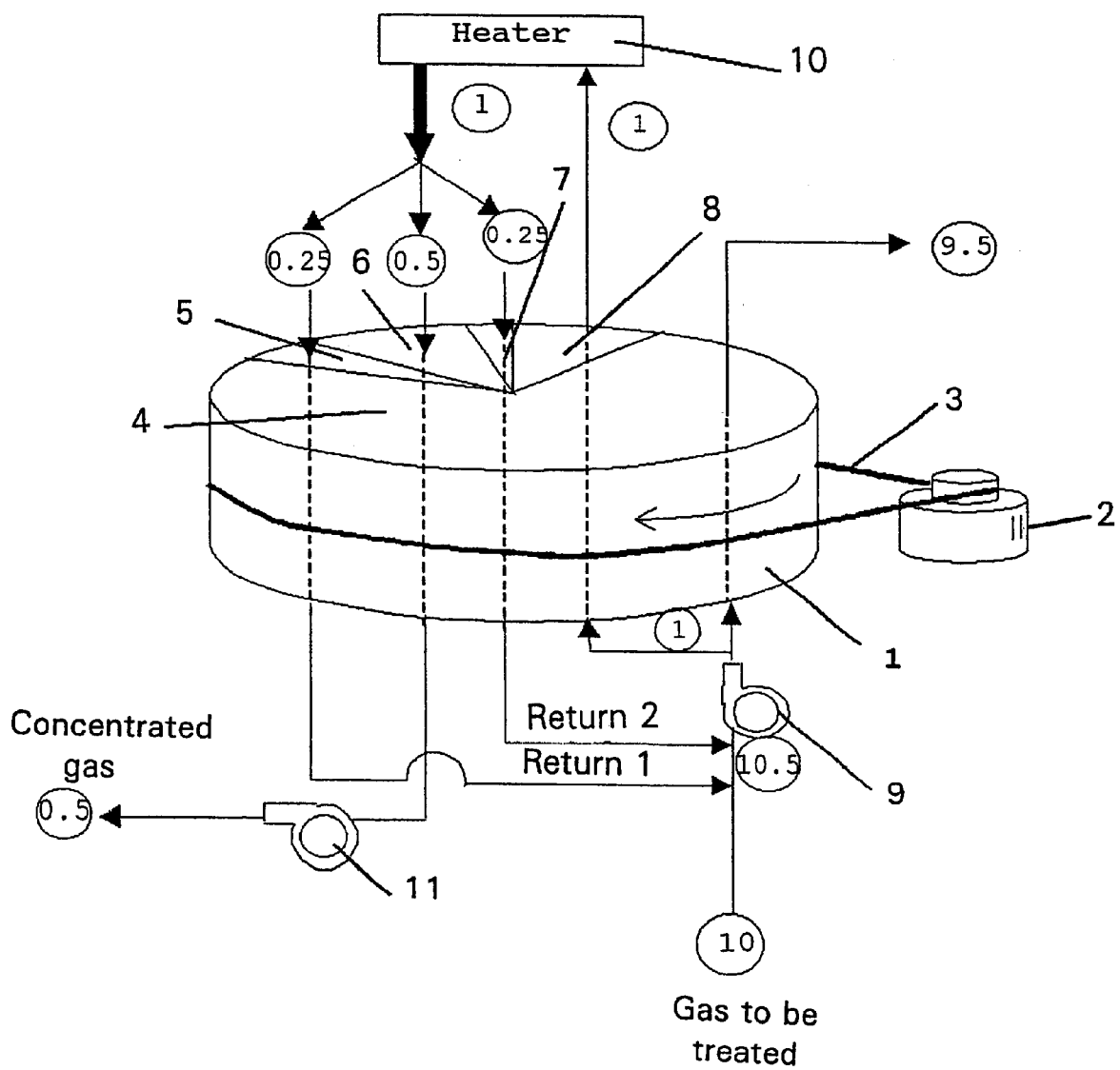
FIG. 1 is a flow sheet of Example 1 of the gas adsorbing and concentrating apparatus according to a preferred embodiment of the present invention.

Reference will now be made in detail to the present preferred embodiments of the invention, examples of which are illustrated in the accompanying drawings, wherein like reference numerals refer to like elements throughout.

According to a preferred embodiment of the present invention, FIG. 1 is a flow sheet of an example gas adsorbing and concentrating apparatus. Adsorbing rotor 1 is made of a corrugated sheet and a plane sheet, both comprised of a non-flammable paper such as ceramic paper. The two sheets are laminated together, wound round, and hydrophobic zeolite is carried on the resulting honeycomb adsorbing rotor. Geared motor 2 drives and rotates the adsorbing rotor 1 through a belt 3. Geared motor 2 and belt 3 serve as a drive device. The adsorbing rotor 1 is housed in a casing or other equipment (not shown in FIG. 1). This construction is taught, for example, by the Japanese laid-open publication without examination No.226037 of Heisei 6 (1994).

Figure 2:
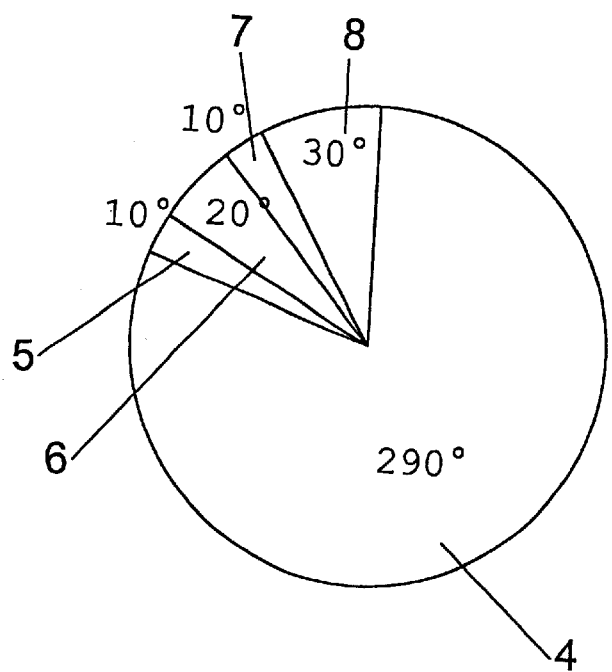
FIG. 2 is a top plan view showing the zones of the adsorbing rotor in the gas adsorbing and concentrating apparatus used in the preferred embodiment of the present invention.

The air stream path through the adsorbing rotor 1 is divided into an adsorbing zone 4, a first desorbing zone 5, a second desorbing zone 6, a third desorbing zone 7, and a purge zone 8 along the rotating direction. Each zone occupies an area defined by a central angle. As shown in FIG. 2, the angle of the adsorption zone 4 is 290°, that of the first desorbing zone 5 is 10°, that of the second desorbing zone 6 is 20°, that of the third desorbing zone 7 is 10°, and that of the purge zone 8 is 30°.

Blower 9 impels the air to be treated to the adsorbing zone 4 and the purge zone 8. The air discharged from the purge zone 8 is introduced to the heater 10 and is then conducted to the first, second and third desorbing zones 5, 6, 7.

The air streams containing gases discharged from the first desorbing zone 5 and the third desorbing zone 7, labeled return 1 and return 2 on FIG. 1, are introduced to the inlet of the treating air blower 9.

The gas-containing air stream discharged from the second desorbing zone 6 is sent as a highly concentrated-gas containing air stream by a desorbing air blower 11 to a burning apparatus, etc. (not shown in the drawing).

Figure 3:
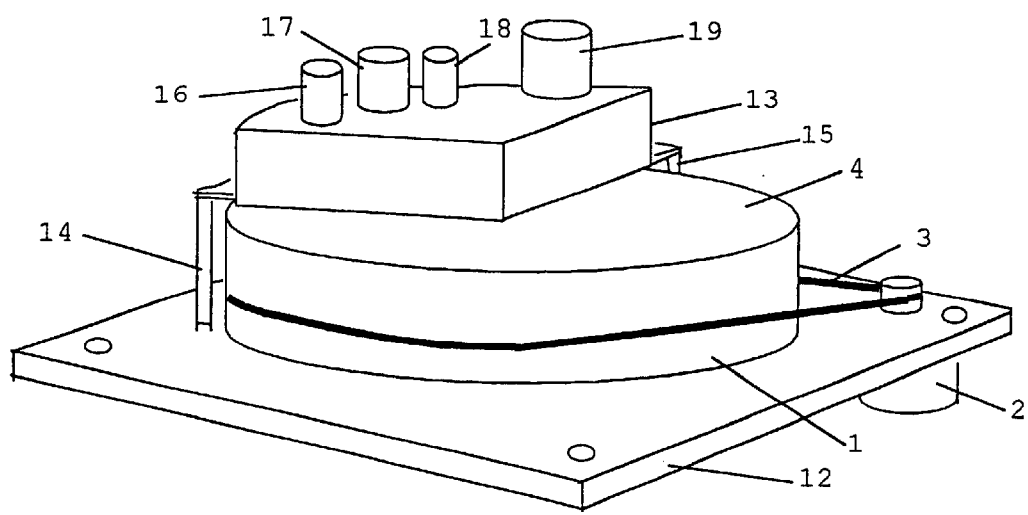
FIG. 3 is a perspective view showing Example 1 of the gas adsorbing and concentrating apparatus according to the preferred embodiment of the present invention.

FIG. 3 shows a perspective view of the essential parts of a gas adsorbing and concentrating apparatus according to the preferred embodiment of the present invention. The adsorbing rotor 1 is set on the foundation 12 rotatably. Also, the geared motor 2 is set on the foundation 12. Chamber 13 stands on foundation 12 by support pillars 14, 15. The inner space of chamber 13 is divided into five rooms: the adsorbing zone 4, the first desorbing zone 5, the second desorbing zone 6, the third desorbing zone 7, and the purge zone 8. In FIG. 3, elements 12–14 serve as a casing. Although not shown, the adsorbing rotor 1 may be totally enclosed in the casing.

Connection pipes 16, 17, 18, 19 are connected on one end to the positions corresponding to the adsorbing zone 4, the first desorbing zone 5, the second desorbing zone 6, the third desorbing zone 7, and the purge zone 8. On the other end, the pipes connect to the heater 10. The connection pipes 16–19, together with the blowers 9, 11, serve as a gas movement device.

Openings are established on foundation 12 in the positions corresponding to the adsorbing zone 4, the first desorbing zone 5, the second desorbing zone 6, the third desorbing 7, and the purge zone 8. A chamber symmetric to the chamber 13 is set (not shown in the drawing) on the foundation 12.

The gas adsorption and concentration apparatus functions as follows.

First, electric current is applied to the geared motor 2, the treating air blower 9, the heater 10, and the desorbing air blower 11 to power the gas adsorption and concentration apparatus.

Figure 4:
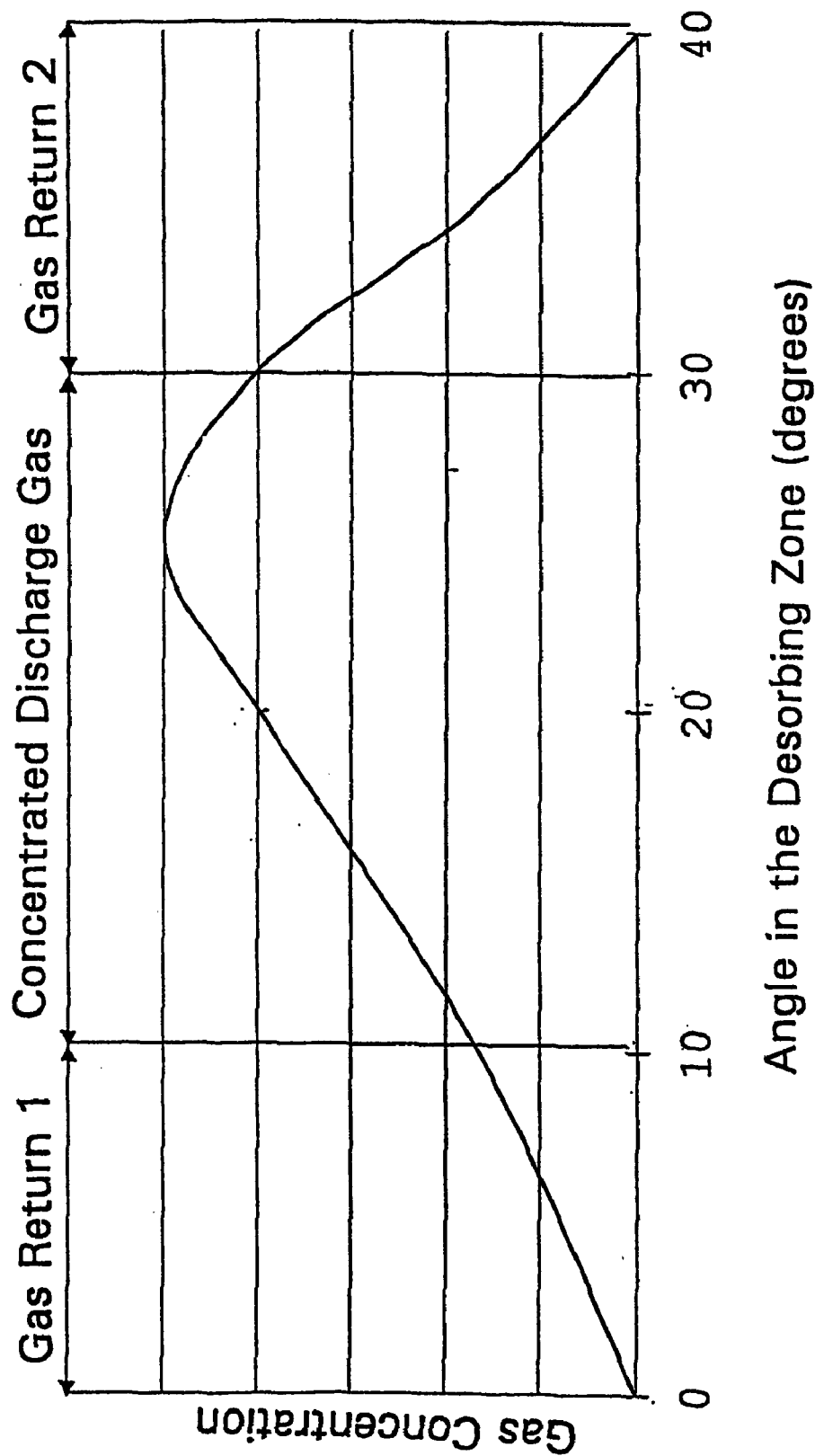
FIG. 4 is a drawing showing the distribution of gas concentration gas at the desorbing zone outlet in the gas adsorbing and concentrating apparatus according to the preferred embodiment of the present invention.

Next, the VOCs contained in the air are adsorbed on the adsorbing zone 4 of the adsorbing rotor 1. The part of the adsorbing rotor 1 which adsorbed the VOC then rotates to the first desorbing zone 5, the second desorbing zone 6 and the third desorbing zone 7. At the first desorbing zone 5, the second desorbing zone 6, and the third desorbing zone 7, the adsorbed VOCs are desorbed by hot air discharged from the heater 10. FIG. 4 shows the distribution data for the VOC concentration at the outlet of each desorbing zone. As seen in FIG. 4, the concentration of the VOC is highest near the center of the desorbing zone, and lowest at both sides. Accordingly, the VOC concentration in the air discharged from the second desorbing zone 6 is higher than that discharged from the other desorbing zones 5, 7. Only the air with the highest VOC concentration is treated further by for example sending a burning apparatus. This is because gases discharged from the desorbing zones 5, 7 are returned to the adsorbing zone 4 without treating.

Furthermore, the volume of air that passes through each part is shown in FIG. 1. When the volume of air to be treated is 10.00, the volume of air passing through adsorbing zone 4 is 9.50, the volume of air passing through purge zone 8 is 1.00, the volume of air passing through the first and the third desorbing zones 5, 7 is 0.25, and the volume of air passing through the second desorbing zone 6 is 0.50. Accordingly, the volume of air that passes through the first and the third desorbing zones 5, 7 and then returns to the adsorbing zone 4 is 0.50. As a result of this flow system, when the volume of air to be treated is 10.00, the volume of the purified air exit stream becomes 9.50 and the volume of the highly concentrated VOC exit stream is 0.50.

In the above-described example, a purge zone 8 is provided. The purge zone is not required, however, and a part of the air discharged from the processing air blower 9 may be sent directly to the heater 10.

Furthermore, although in the above-described example the first desorbing zone 5 and the third desorbing zone 7 have the same central angle, the central angle of the first desorbing zone 5 may be larger than that of the third desorbing zone 7. This may be done in order to make VOC concentration in the air discharged from the first desorbing zone 5 substantially the same as that in the air discharged from the third desorbing zone 7.

Figure 5:
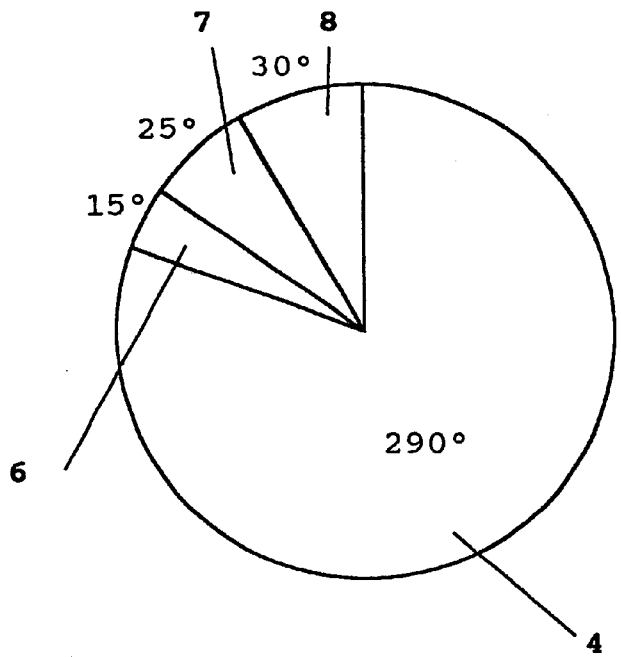
FIG. 5 is a top plan view showing the zones of the adsorbing rotor in the gas adsorbing and concentrating apparatus used in an embodiment of the preferred embodiment of the present invention.

When the VOCs contained in the air to be treated have a low boiling point and are desorbed from the adsorbing rotor quickly, the first desorbing zone 5, shown in FIG. 2, is deleted and the size of the third desorbing zone 7 is increased. As shown in FIG. 5, the desorbing zone is divided into a desorbing zone 6 having a narrow central angle and a desorbing zone 7 having a wide central angle. The air containing a high concentration of VOCs from the desorbing zone having a narrow central angle is sent for further treatment, perhaps to a burning apparatus, by the blower 11. Air having a low VOC concentration desorbed at the desorbing zone 7 having a wide central angle is returned to the air to be treated as a return air 2 by a blower 9.

Figure 6:
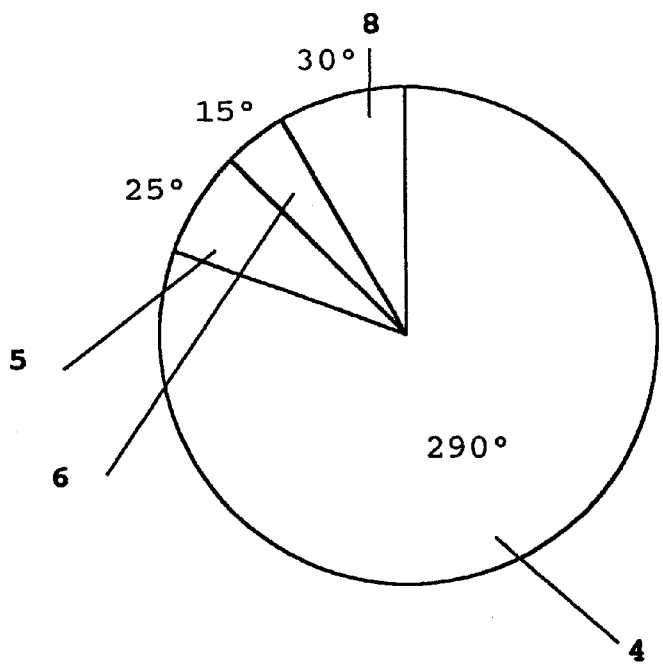
FIG. 6 is a top plan view showing the zones of the adsorbing rotor in the gas adsorbing and concentrating apparatus used in an embodiment of the preferred embodiment of the present invention.

Conversely, when the VOCs contained in the air to be treated have a high boiling point and are desorbed from the adsorbing rotor at the rear part of the desorbing zone where the temperature of said part reaches sufficient temperature to desorb the adsorbed gas, the third desorbing zone 7 shown in FIG. 2 is deleted and the size of the first desorbing zone 5 is increased. As shown in FIG. 6, the desorbing zones are divided into a desorbing zone 5 having a wide central angle and a desorbing zone 6 having a narrow central angle. The air having a low VOC concentration from the desorbing zone 5 having a wide central angle is returned to the air to be treated and is input to the blower 9. The air having a high VOC concentration from the desorbing zone 6 having a narrow central angle is sent by the blower 11 to further treat, by a burning apparatus, for example.

In the above described examples, the present invention has been described for the treatment of air containing a flammable VOCs. The present invention can, of course, be used to remove unwanted components from inactive gases other than air, such as nitrogen. Suitable inactive gases are those which would not be adsorbed on the adsorbing rotor while the unwanted components, such as VOCs, would be adsorbed.

The apparatus for adsorbing and concentrating gas according to the preferred embodiment of the present invention has a simple construction. The desorbing zone is divided into plural zones so that the air discharged from one or more of the desorbing zones is returned to the adsorbing zone. This significantly increases the VOC concentration in the gas discharged from the remaining desorbing zones, which gas is output from the device. In experiments performed by the applicant, certain gasses in air could be concentrated to increase the concentration approximately more than 20 times.

In other words, air containing a low VOC concentration of 50 ppm could be concentrated to produce air containing a high VOC concentrated of approximately 1000 ppm. This concentration is high enough to support self-combustion in a burning apparatus.

While the invention has been described in connection with the preferred embodiments, it will be understood that modifications within the principle outlined above will be evident to those skilled in the art. Thus, the invention is not limited to the preferred embodiments, but is intended to encompass such modifications.

What is claimed is:

1. An apparatus for treating gases, comprising:
    a honeycomb rotor carrying an adsorbent thereon;
    a casing housing the honeycomb rotor, the casing having an adsorbing zone and a plurality of desorbing zones;
    a drive device to rotate the honeycomb rotor through the adsorbing zone and plurality of desorbing zones of the casing; and
    a gas movement device to move gas through the casing and the honeycomb rotor such that gas moved through one of the desorbing zones is discharged and gas moved through a remainder of the desorbing zones is returned to the adsorbing zone.

2. An apparatus for treating gas according to claim 1, wherein the casing has at least three desorbing zones such that gas moved through two of the three desorbing zones is returned to the adsorbing zone.

3. An apparatus for treating gas according to claim 2, wherein the plurality of desorbing zones are adjacent with two end desorbing zones and a middle desorbing zone, gas from the middle desorbing zone being discharged.

4. An apparatus for treating gas according to claim 1, wherein the casing further has a purge zone, the gas movement device moving gas from the purge zone into the plurality of desorbing zones.

5. An apparatus for treating gas according to claim 4, further comprising a heater, the gas from the purge zone being heated by the heater before introduction into the plurality of desorbing zones.

6. An apparatus for treating gas according to claim 1, wherein before being returned to the adsorbing zone, the gas moved through the remainder of the desorbing zones is combined with gas containing contaminants to be removed.

7. An apparatus for treating gas according to claim 1, wherein the adsorbent is hydrophobic zeolite.

8. An apparatus for treating gas according to claim 1, wherein the honeycomb rotor is formed of ceramic paper.

9. An apparatus for treating gas, comprising:
    a honeycomb rotor carrying an adsorbent thereon;
    a casing housing the honeycomb rotor, the casing having an adsorbing zone, a plurality of desorbing zones and a purge zone;
    a drive device to rotate the honeycomb rotor through the plurality of zones;
    a heater to heat gas moved through the purge zone;
    a gas movement device to move gas through the casing and the honeycomb rotor such that:
        gas from the purge zone is moved through the plurality of desorbing zones after being heated by the heater,
        gas from one of the desorbing zones is discharged, and
        gas from a remainder of the desorbing zones is combined with gas containing contaminants to be removed, and then moved through the adsorbing zone and the purge zone.

10. A method for treating gas using a honeycomb rotor carrying an adsorbent thereon and having an adsorbing zone and a plurality of desorbing zones, comprising the steps of:
    (a) moving gas through the plurality of adsorbing zone and plurality of desorbing zones of the honeycomb rotor;
    (b) discharging gas moved through one of the desorbing zones; and
    (c) returning to the adsorbing zone gas moved through a remainder of the desorbing zones.

11. A method for treating gas according to claim 10, wherein the honeycomb rotor is divided into the adsorbing zone and the plurality of desorbing zones by a casing that houses the honeycomb rotor, the method further comprising the step of rotating the honeycomb rotor through the adsorbing zone and plurality of desorbing zones of the casing.

12. A method for treating gas according to claim 10, wherein the honeycomb rotor has at least three desorbing zones, such that gas moved through two of the three desorbing zones is returned to the adsorbing zone.

13. An method for treating gas according to claim 10, wherein the honeycomb rotor further has a purge zone, the method further comprising the steps of moving gas from the purge zone into the plurality of desorbing zones.

14. A method for treating gas according to claim 10, further comprising the step of heating the gas from the purge zone before introduction into the plurality of desorbing zones.

15. A method for treating gas according to claim 10, further comprising the step of combining the gas moved through the remainder of the desorbing zones with gas containing contaminants to be removed, before step (c).

16. A method for treating gas according to claim 15, wherein the gas containing contaminants is air containing volatile organic compounds.

* * * * *